(12) United States Patent
Naito

(10) Patent No.: US 7,509,986 B2
(45) Date of Patent: Mar. 31, 2009

(54) TIRE WHEEL ASSEMBLY

(75) Inventor: Mitsuru Naito, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 280 days.

(21) Appl. No.: 10/567,547

(22) PCT Filed: Jun. 22, 2004

(86) PCT No.: PCT/JP2004/008736

§ 371 (c)(1),
(2), (4) Date: Feb. 8, 2006

(87) PCT Pub. No.: WO2005/018960

PCT Pub. Date: Mar. 3, 2005

(65) Prior Publication Data

US 2006/0219344 A1 Oct. 5, 2006

(30) Foreign Application Priority Data

Aug. 26, 2003 (JP) ............................. 2003-301135

(51) Int. Cl.
*B60C 17/00* (2006.01)
*B60C 17/04* (2006.01)
(52) U.S. Cl. ...................... 152/516; 152/520
(58) Field of Classification Search ............... 152/516, 152/517, 518, 519, 520, 454, 455, 456
See application file for complete search history.

(56) References Cited

U.S. PATENT DOCUMENTS 6,463,974 B1 * 10/2002 Hellweg et al. .............. 152/400
6,463,976 B1 * 10/2002 Glinz et al. ................. 152/520
6,640,857 B2 * 11/2003 Ikeda .......................... 152/158

FOREIGN PATENT DOCUMENTS

| EP | 1002667 | * | 6/2000 |
| GB | 2015439 | * | 9/1979 |
| JP | 7-232507 | * | 9/1995 |
| JP | 10-297226 A1 | | 11/1998 |

(Continued)

OTHER PUBLICATIONS

International Search Repport, Sep. 28, 2004.

*Primary Examiner*—Justin Fischer
(74) *Attorney, Agent, or Firm*—Greer, Burns & Crain, Ltd.

(57) ABSTRACT

Disclosed is a tire wheel assembly allowed to enhance working efficiency in rim assembling without destabilizing mounting of a run-flat support member, and furthermore, allowed to realize noise reduction by improving a vibration characteristic during normal traveling. The tire wheel assembly is one where, while a pneumatic tire is fitted to a rim of a wheel, inserted into a cavity portion of the pneumatic tire is a run-flat support member formed of a pair of elastic rings fitted to the rim; and an annular shell straddling between the elastic rings. In the tire wheel assembly, inner diameters of the pair of elastic rings are made different from each other to make an inner diameter of one elastic ring fitted to the rim in a back side of the wheel smaller than an inner diameter of the other elastic ring fitted to the rim in a front side of the wheel.

5 Claims, 2 Drawing Sheets

FOREIGN PATENT DOCUMENTS

| | | |
|---|---|---|
| JP | 2001-163020 A1 | 6/2001 |
| JP | 2001-519279 A1 | 10/2001 |
| JP | 2004-051003 | 2/2004 |
| JP | 2004-058719 | 2/2004 |
| JP | 2004-058795 | 2/2004 |
| JP | 2004-058917 | 2/2004 |
| JP | 2004-175271 | 6/2004 |

* cited by examiner

TIRE WHEEL ASSEMBLY

TECHNICAL FIELD

The present invention relates to a tire wheel assembly realizing run-flat traveling, and more specifically, relates to a tire wheel assembly allowed to enhance working efficiency in rim assembling without destabilizing mounting of a run-flat support member.

BACKGROUND ART

Even when a pneumatic tire goes flat, a number of technologies, which enables the tire to make an emergency run for a reasonable amount of mileage, have been proposed in response to the market demanding such a technology as above. Among the thus proposed technologies, there is a technology which realizes run-flat traveling in a manner that, with a core being mounted on a rim inside a cavity portion of a pneumatic tire, the pneumatic tire in a deflated condition is supported by the core (for example, refer to Patent Documents 1 to 3).

A run-flat support member as described above is formed of a configuration: which includes an annular shell formed in a structure with legs astride which, while having an abutting portion projected on an outer peripheral side of the structure, has legs along both sides of the abutting portion, the abutting portion being intended to abut an inner surface of a tire; and where elastic rings are respectively fixed to these legs. The run-flat support member is intended to be mounted on the rim through the elastic rings. According to this run-flat support member, the run-flat support member can be used, substantially without adding any particular modifications to existing wheel and rim, with the existing wheel and rim as they are, and hence have an advantage that it can be made acceptable to the market without bringing any serious confusion to the market.

When the above run-flat support member is mounted onto a tire wheel assembly, it is necessary to insert the run-flat support member in a cavity portion of a pneumatic tire at first, and then to perform rim assembling work of the pneumatic tire in a state where this run-flat support member is contained therein. For this reason, for the purpose of facilitating the rim assembling work, it is desired that the elastic rings of the run-flat support member easily go over rim flanges, that is, inner diameters of the elastic rings be as large as possible. However, if the inner diameters of the elastic rings are made uniformly large, there arises a problem that the mounting of the run-flat support member becomes unstable.

[Patent Document 1] Japanese patent application Kohyo publication No. 2001-519279

[Patent Document 2] Japanese patent application Kokai publication No. 2001-163020

[Patent Document 3] Japanese patent application Kokai publication No. Hei10-297226

DISCLOSURE OF THE INVENTION

An object of the present invention is to provide a tire wheel assembly allowed to enhance working efficiency in rim assembling without destabilizing mounting of a run-flat support member, and furthermore, allowed to realize noise reduction by improving a vibration characteristic during normal traveling.

A tire wheel assembly of the present invention for achieving the above object is one where, while a pneumatic tire is fitted to a rim of a wheel, a run-flat support member is inserted into a cavity portion of the pneumatic tire, the run-flat support member being formed of a pair of elastic rings fitted to the rim; and an annular shell straddling between the elastic rings. The tire wheel assembly is characterized in that inner diameters of the pair of elastic rings are made different from each other to make an inner diameter of one elastic ring fitted to the rim in a back side of the wheel smaller than that of the other elastic ring fitted to the rim in a front side of the wheel.

In the present invention, an outer diameter of the run-flat support member is formed to be smaller than an inner diameter of a tread portion of the pneumatic tire for the purpose of keeping the run-flat support member and the pneumatic tire apart in a constant distance. On the other hand, an inner diameter thereof is formed to have a measurement substantially equal to an inner diameter of a bead portion of the pneumatic tire. This run-flat support member constitutes a tire wheel assembly in a manner that it is mounted onto a rim with a pneumatic tire in a state where it is inserted into a cavity portion of the pneumatic tire. When the pneumatic tire goes flat while a vehicle is running with the tire wheel assembly mounted thereon, run-flat traveling becomes possible because the flat tire in a deflated condition goes into a state where it is supported by the run-flat support member.

In the present invention, in consideration of working efficiency in rim assembling and of noise due to road noise, the inner diameters of the pair of elastic rings are made different from each other. That is, because the elastic ring and the tire bead portion both intended to be arranged in the front side of the wheel do not easily go over a rim flange in the front side of the wheel at the time of rim assembling, the inner diameter of the elastic ring in the front side of the wheel is made relatively large. Thereby, working efficiency in rim assembling can be improved. On the other hand, because the elastic ring and the tire bead portion both intended to be arranged in the back side of the wheel easily go over the rim flange in the front side of the wheel, and additionally because vibration is more likely to occur in the back side of the wheel, the inner diameter of the elastic ring in the back side of the wheel is made relatively small. Thereby, an effect of reducing road noise in a frequency band of 400 to 500 Hz is obtained. Moreover, although the inner diameter of the elastic ring in the front side of the wheel is made relatively large, mounting of the run-flat support member is not destabilized because the inner diameter of the elastic ring in the back side of the wheel is made relatively small.

In the present invention, for the purpose of compatibly achieving the working efficiency in rim assembling and the vibration characteristic, it is preferable that the inner diameter of the elastic ring fitted to the rim in the back side of the wheel be at least 0.2 mm smaller than that of the elastic ring fitted to the rim in the front side of the wheel. More specifically, it is preferable: that the inner diameter of the elastic ring fitted to the rim in the back side of the wheel be set in a range obtained by adding −1.5 to 0.0 mm to an outer diameter of a hump in the back side of the wheel; and that the inner diameter of the elastic ring fitted to the rim in the front side of the wheel be in a range obtained by adding −0.2 to 0.7 mm to an outer diameter of a hump in the front side of the wheel.

Particularly for the purpose of improving the vibration characteristic, it is preferable that a reinforcement core be buried in the elastic ring fitted to the rim in the back side of the wheel, the reinforcement core being continuous in a circumferential direction of the tire wheel assembly. Additionally, it is preferable to provide a projection, which is continuous in the circumferential direction of the tire wheel assembly, on one side of a radially inner end portion of the elastic ring fitted to the rim in the back side of the wheel, the one side being outward in an axial direction of the tire wheel assembly. In this case, not only an effect of improving the vibration characteristic can be obtained, but stability of mounting of the run-flat support member can be enhanced. A height and a width of the above projection may be in ranges respectively of 0.4 to 1.5 mm and of 5.0 to 15.0 mm. Furthermore, if a radially inner end portion of the elastic ring fitted to the rim in the back side of the wheel is recessed in the same shape as the hump, the vibration reduction effect is obtained as obtained in the above manner.

BEST MODE FOR CARRYING OUT THE INVENTION

Hereinbelow, a detailed description will be given of a configuration of the present invention with reference to the attached drawings.

Figure 1:
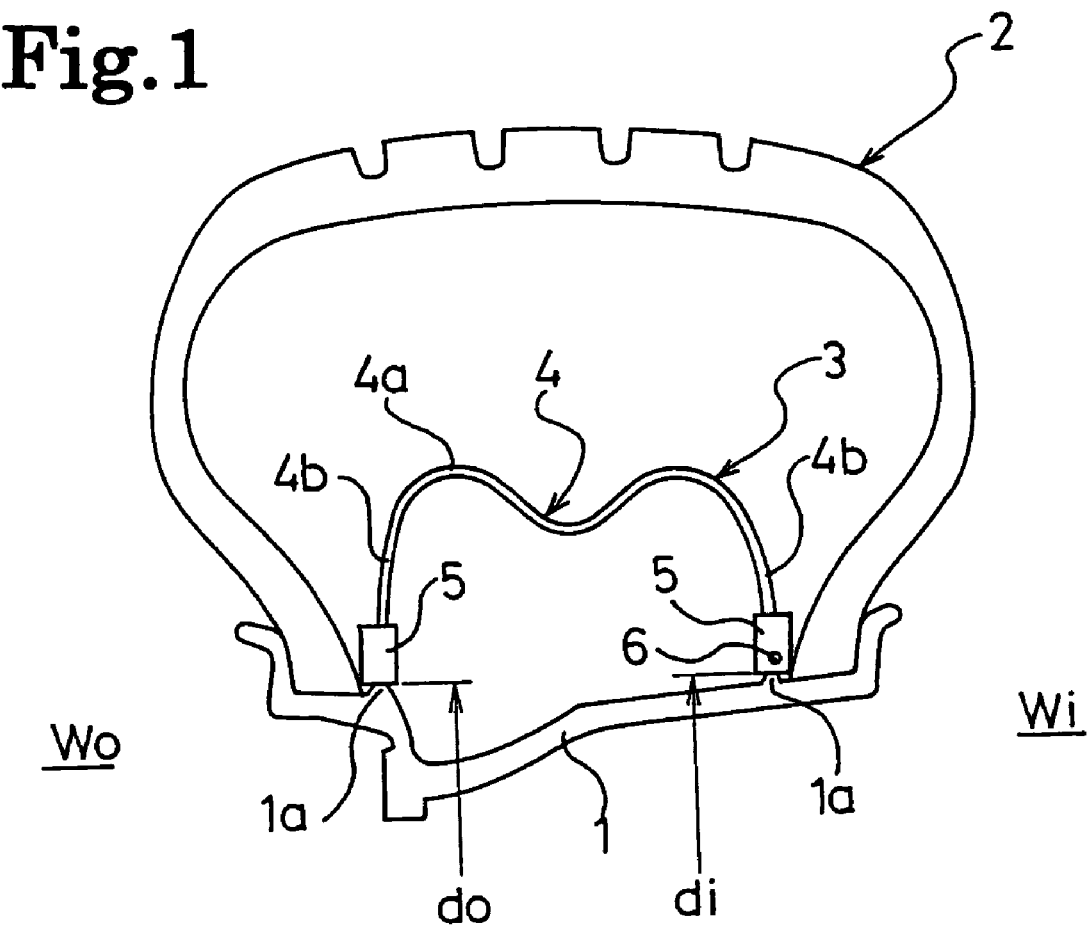
FIG. 1 is a cross-sectional view showing a main portion of a tire wheel assembly configured of an embodiment of the present invention, taken along a meridian thereof.

FIG. 1 is a cross-sectional view showing a main portion of a tire wheel assembly (tired wheel) configured of an embodiment of the present invention, taken along a meridian thereof, and reference numerals 1, 2, and 3 denote a rim of the wheel, a pneumatic tire, and a run-flat support member, respectively. These rim 1, pneumatic tire 2 and run-flat support member 3 are respectively formed in annular shapes whose center is commonly an unillustrated rotational axis of the wheel.

The run-flat support member 3 is constituted of an annular shell 4 and elastic rings 5 as main members. The run-flat support member 3 is apart from an inner surface of the pneumatic tire 2 during normal traveling, but supports, from within, the pneumatic tire 2 in a deflated condition when it goes flat.

The annular shell 4 is formed in a structure with legs astride where, while an abutting portion 4a, which abuts an inner surface of the tire in a deflated condition, is projected on an outer peripheral side (on a radially outward side) of the structure, legs 4b, 4b are provided along both sides of the abutting portion 4a. The abutting portion 4a of the annular shell 4 is formed in order that a profile of an outer surface thereof can form a convex curved surface on an outer peripheral side in a cross section taken along a direction orthogonal to a circumferential direction thereof. At least one such convex curved surface may be provided, but it is preferable that at least two such convex curved surfaces be aligned in an axial direction of the tire. By forming the abutting portion 4a of the annular shell 4 with the two or more convex curved surfaces being aligned therein, locations where the abutting portion 4a contacts the inner surface of the tire are distributed among two or more locations, whereby local abrasion given to the inner surface of the tire is reduced. Therefore, a sustainable mileage of run-flat traveling can be extended.

The above annular shell 4 is as thin as 0.5 to 5.0 mm in thickness, and is constituted of a highly stiff material in order to support a weight of a vehicle through the tire in a deflated condition. For the constituting material thereof, a metal, a resin or the like can be used. For the metal, steel, aluminum and the like can be cited. For the resin, any one of a thermoplastic resin and a thermosetting resin is applicable. As the thermoplastic resin, nylon, polyester, polyethylene, polypropylene, polystyrene, polyphenylene sulfide, ABS and the like can be cited, and as the thermosetting resin, an epoxy resin, an unsaturated polyester resin and the like can be cited. The resin may be used only by itself, or may be used as a fiber-reinforced resin with reinforcing fibers blended therein.

The elastic rings 5 are respectively fixed to legs 4b, 4b of the annular shell 4, and are intended to support the annular shell 4 while abutting left and right sides of a rim sheet. These elastic rings 5 stably support the annular shell 4 by preventing the annular shell 4 from slipping against the rim sheet, as well as reducing shock and vibration received by the annular shell 4 from the pneumatic tire 2 in a deflated condition.

As a material constituting the elastic rings 5, rubber or a resin can be used, and in particular, rubber is preferable. As the rubber, natural rubber (NR), isoprene rubber (IR), styrene-butadiene rubber (SBR), butadiene rubber (BR), hydrogenated NBR, hydrogenated SBR, ethylene-propylene rubber (EPDM or EPM), butyl rubber (IIR), acrylic rubber (ACM), chloroprene rubber (CR), silicon rubber, fluoro rubber, and the like can be cited. Needless to say, additives such as a filler, a vulcanizer, a vulcanization accelerator, a softener and an antioxidant can be blended in the rubber appropriately. Here, a desired elasticity can be obtained based on a blend of the rubber composition.

In the tire wheel assembly thus configured, when the tire goes flat during traveling, the pneumatic tire 2 in a deflated condition goes into a state where it is supported by the run-flat support member 3, whereby run-flat traveling becomes possible.

Figure 2:
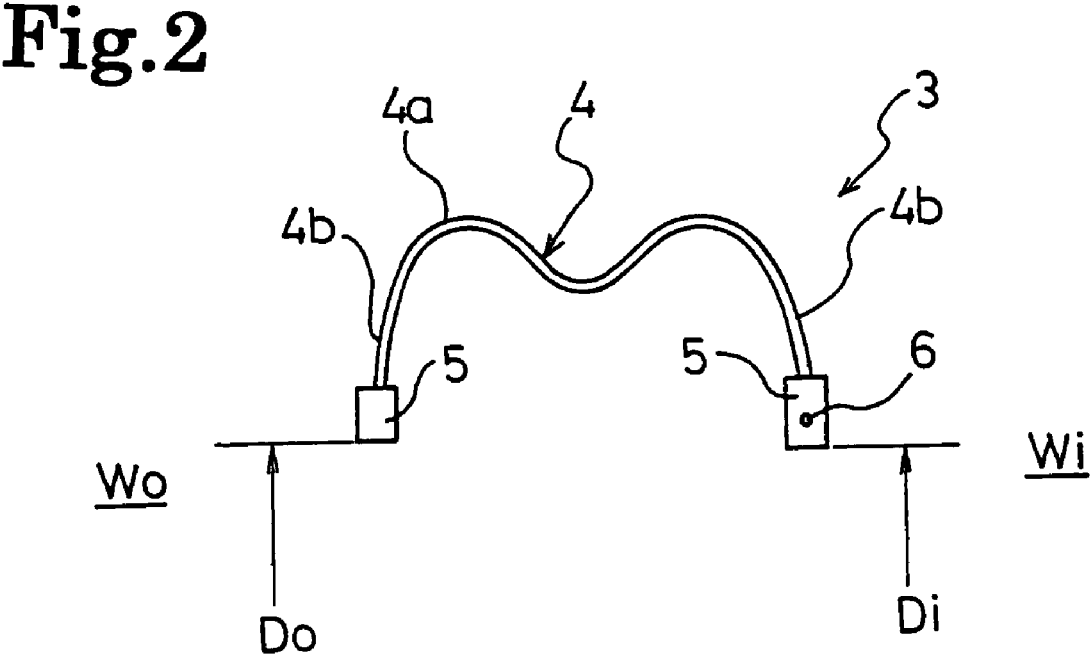
FIG. 2 is a cross-sectional view showing an individual unit of an unattached run-flat support member of the present invention, taken along a meridian thereof.
Figure 3:
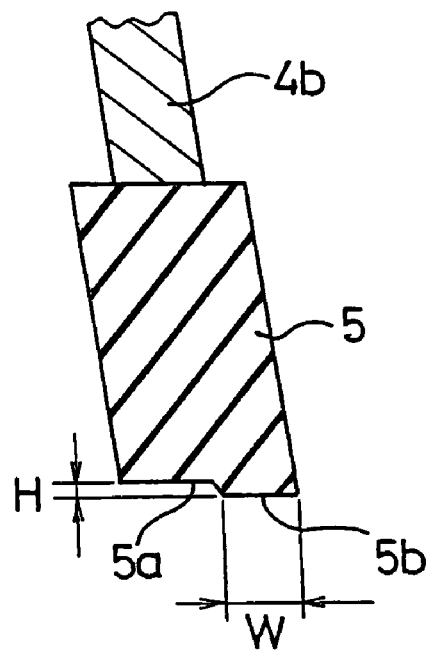
FIG. 3 is a cross-sectional view showing a modification example of an elastic ring for the run-flat support member of the present invention.

In the above tire wheel assembly, a pair of the elastic rings 5, 5 have inner diameters different with each other, and an inner diameter of the elastic ring 5 fitted to the rim 1 in a back side Wi of the wheel (an inward side with respect to a vehicle) is smaller than an inner diameter of the elastic ring 5 fitted to the rim 1 in a front side Wo of the wheel (an outward side with respect to a vehicle). That is, as shown in FIG. 2, in an individual unit of the run-flat support member 3 before it is attached to the rim 1, the inner diameter Di of the elastic ring 5 for the back side Wi of the wheel is smaller than an inner diameter Do of the elastic ring 5 for the front side Wo of the wheel.

During rim assembling, the elastic ring 5 intended to be arranged in the wheel back side Wi is mounted, together with a bead portion of the tire, onto the rim 1 through the wheel front side Wo, and then the elastic ring 5 intended to be arranged in the wheel front side Wo is mounted, together with another bead portion of the tire, onto the rim 1 through the wheel front side Wo. In this occasion, although it is otherwise difficult for the elastic ring 5 intended to be arranged on the wheel front side Wo to go over, together with the tire bead portion, a rim flange in the wheel front side Wo, if the inner diameter Do of the elastic ring 5 in the wheel front side Wo is made relatively large as described above, it becomes possible to improve working efficiency in rim assembling.

On the other hand, it is easy for the elastic ring 5 arranged in the wheel back side Wi to go over, together with the tire bead portion, the rim flange in the wheel front side Wo, and additionally, vibration is more likely to occur in the wheel back side Wi. In this respect, if the inner diameter Di of the elastic ring 5 in the wheel back side Wi is made relatively small, road noise can be reduced in a frequency band of 400 to 500 Hz. Moreover, although the inner diameter Do of the elastic ring 5 in the wheel front side Wo is made relatively large, mounting of the run-flat support member 3 is not destabilized because the inner diameter Di of the elastic ring 5 in the wheel back side Wi is made relatively small.

In the above tire wheel assembly, it is preferable that the inner diameter Di of the elastic ring 5 in the wheel back side Wi be at least 0.2 mm smaller than the inner diameter Do of the elastic ring 5 in the wheel front side Wo. If a difference between the inner diameters Di and Do is less than 2.0 mm, the above operational effects become insufficient.

In FIG. 1, while humps 1a are provided to the rim 1 in positions next to the rim sheet, the inner diameters Di and Do may be formed in appropriate measurements relative to outer diameters of the humps 1a. That is, the inner diameter Di of the elastic ring 5 in the wheel back side Wi may be set in a range obtained by adding −1.5 to 0.0 mm to an outer diameter di of the hump 1a in the wheel back side Wi, and that the inner diameter Do of the elastic ring 5 in the wheel front side Wo may be set in a range obtained by adding −0.2 to 0.7 mm to an outer diameter do of the hump 1a in the wheel front side Wo. If the inner diameter Di of the elastic ring 5 in the wheel back side Wi is smaller than the above range, the working efficiency in rim assembling is deteriorated, and to the contrary, if it exceeds the above range, a reduction effect on road noise becomes insufficient. On the other hand, if the inner diameter Do of the elastic ring 5 in the wheel front side Wo is smaller than the above range, working efficiency in rim assembling is deteriorated, and to the contrary, if it exceeds the above range, mounting stability of the run-flat support member 3 is deteriorated.

As shown in FIG. 1, a reinforcement core 6 may be buried at least in the elastic ring 5 in the wheel back side Wi, the reinforcement core 6 being continuous in a circumferential direction of the tire wheel assembly. This reinforcement core 6 is constituted of a material, such as a metal or a resin, which is higher in stiffness than the material constituting the elastic rings 5. For the metal, steel, aluminum or the like can be used. On the other hand, for the resin, any one of a thermoplastic resin and a thermosetting resin is applicable. As the thermoplastic resin, nylon, polyester, polyethylene, polypropylene, polystyrene, polyphenylene sulfide, ABS and the like can be cited, and as the thermosetting resin, an epoxy resin, an unsaturated polyester resin and the like can be cited. The resin may be used only by itself, or may be used as a fiber-reinforced resin with reinforcing fibers blended therein.

The above reinforcement core 6 may have a configuration obtained by winding up a reinforcing cord formed of a metal cord such as a steel cord, or of an organic-fiber cord such as a nylon cord. In the case of thus winding up the reinforcing cord, one such reinforcing cord may be wound up, or a plurality of such reinforcing cords may be wound up in a bundle.

In the above tire wheel assembly, at least with respect to the elastic ring 5 in the wheel back side Wi, a projection 5b continuous in the circumferential direction of the tire wheel assembly may be provided on one side of a radially inner end portion 5b of the elastic ring 5, the one side being outward in an axial direction of the tire wheel asembly. The projection 5b as described above enhances mounting stability of the run-flat support member 3, as well as preventing vibration from occurring by pressing the rim 1 in an immobilized state. A height of the projection 5b in a radial direction of the tire and a width thereof in an axial direction of the tire may be in ranges of 0.4 to 1.5 mm and of 5.0 to 15.0 mm, respectively.

Figure 4:
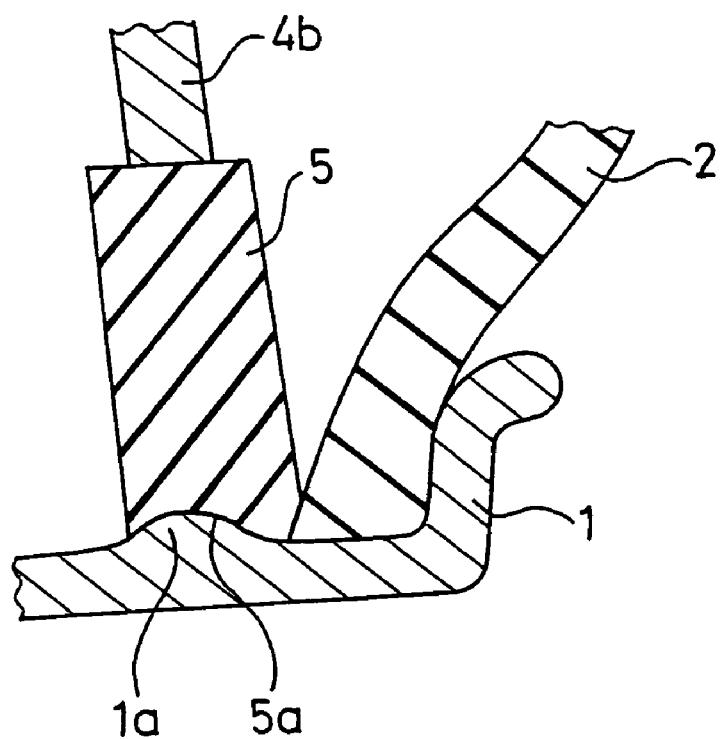
FIG. 4 is a cross-sectional view showing another modification example of an elastic ring for the run-flat support member of the present invention.

Furthermore, in the above tire wheel assembly, at least with respect to the elastic ring 5 in the wheel back side Wi, as shown in FIG. 4, the radially inner end portion 5a of the elastic ring 5 may be recessed in the same shape as the hump 1a. In this case, because an area of an interface between the elastic ring 5 and the rim 1 becomes large, vibration of the rim 1 is reduced more effectively.

While the detailed description has been given of the preferred embodiment of the present invention hereinabove, it should be understood that various modifications to, substitutions for, and replacements with the embodiment can be carried out as long as the modifications, the substitutions, and the replacements do not depart from the spirit and the scope of the present invention defined by the attached scope of claims.

EXAMPLES

A tire wheel assembly formed of a pneumatic tire, which has a tire size of 205/55R16 89V, and a wheel, which has a rim size of 16×6 ½JJ, was formed into a tire wheel assembly (Example) in the following manner. A steel plate having a thickness of 1.0 mm was worked into an annular shell, a run-flat support member was prepared by fixing elastic rings different with each other in inner diameter to both legs of the annular shell, and the tire wheel assembly was prepared by inserting the annular shell into a cavity portion of the pneumatic tire. In this Example, a pair of humps on the rim were made equal in outer diameter, an inner diameter of the elastic ring fitted to the rim in a back side of the wheel was made 1.0 mm smaller than an outer diameter of the humps, and an inner diameter of the elastic ring fitted to the rim in a front side of the wheel was made 0.5 mm larger than the outer diameter of the humps.

Additionally, for the purpose of comparison, by preparing a run-flat support member where inner diameters of a pair of elastic rings were made equal to the outer diameter of the humps, another tire wheel assembly (Conventional Example) was obtained. This tire wheel assembly had a structure which was the same as that of Example except for that the thus prepared run-flat support member was used.

For the above two kinds of tire wheel assemblies, working efficiency in rim assembling, and car interior noise during normal traveling, were assessed in the following measurement methods, and results of the assessment are shown in Table 1.

Working efficiency in rim assembling:

A time required for rim assembling work of each of the tire wheel assemblies were measured. Note that, in the rim assembling work, attention was fully paid to keeping the run-flat support member, which was inserted into the cavity portion of the pneumatic tire, from being deformed. Results of the assessment are represented in index numbers with a measured value for Conventional Example being set as 100, on the basis of an inverse of a measured value. A larger value of the index number indicates that the working efficiency in rim assembling is excellent.

Car interior noise:

Each of the tire wheel assemblies was inflated with an air pressure of 220 kPa, and then was installed to a passenger automobile having a displacement of 2500 cc. Then, a microphone was installed at a position corresponding to an ear of a driver on a window side in a driver's seat in a car interior of the automobile, and a sound pressure of car interior noise thereof was measured when the automobile was run on a rough road surface with a speed of 50 km/h. Results of the assessment are represented in index numbers with a measured value for Conventional Example being set as 100. A smaller value of the index number indicates that the car interior noise is smaller.

TABLE 1

|  | Conventional Example | Example |
|---|---|---|
| Inner diameters of elastic rings | The same diameter for left and right ones | Different diameters for left and right ones |
| Rim assembling workability (index number) | 100 | 105 |
| Car interior noise (index number) | 100 | 95 |

As shown in this Table 1, the tire wheel assembly of Example was excellent in working efficiency in rim assembling, and was smaller in car interior noise during normal traveling.

What is claimed is:

1. A tire wheel assembly where, while a pneumatic tire is fitted to a rim of a wheel, inserted into a cavity portion of the pneumatic tire is a run-flat support member being formed of: a pair of elastic rings fitted to the rim; and an annular shell straddling between the elastic rings, wherein the wheel rim has two outer diameters, one outer diameter measured on a front side of the wheel rim and the other outer diameter measured on a back side of the wheel rim; and said two outer diameters being equal, and wherein inner diameters of the pair of elastic rings are made different from each other to make an inner diameter of one elastic ring fitted to the rim in a back side of the wheel smaller than an inner diameter of the other elastic ring fitted to the rim in a front side of the wheel;

wherein a projection continuous in a circumferential direction of the tire wheel assembly is provided on one side of a radially inner end portion of the elastic ring fitted to the rim in the back side of the wheel, the one side being outward in an axial direction of the tire wheel assembly; and wherein a height and a width of the projection are in ranges of 0.4 to 1.5 mm and of 5.0 to 15.0 mm, respectively.

2. The tire wheel assembly according to claim 1, wherein the inner diameter of the elastic ring fitted to the rim in the back side of the wheel is at least 0.2 mm smaller than the inner diameter of the elastic ring fitted to the rim in the front side of the wheel.

3. The tire wheel assembly according to any one of claims 1 and 2, wherein: the inner diameter of the elastic ring fitted to the rim in the back side of the wheel is set in a range obtained by adding −1.5 to 0.0 mm to an outer diameter of a hump in the back side of the wheel; and the inner diameter of the elastic ring fitted to the rim in the front side of the wheel is set in a range obtained by adding −0.2 to 0.7 mm to an outer diameter of a hump in the front side of the wheel.

4. The tire wheel assembly according to any one of claims 1 and 2, comprising a reinforcement cord continuous in a circumferential direction of the tire wheel assembly is buried in the elastic ring fitted to the rim in the back side of the wheel.

5. The tire wheel assembly according to any one of claims 1 and 2, wherein a radially inner end portion of the elastic ring fitted to the rim in the back side of the wheel is recessed in the same shape as a hump.

* * * * *